Jan. 23, 1940.                H. B. SCHULHOFF                2,188,162
                              SEWAGE TREATMENT
                            Filed Feb. 21, 1938            2 Sheets-Sheet 1
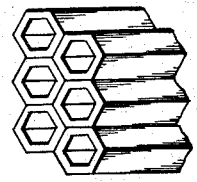
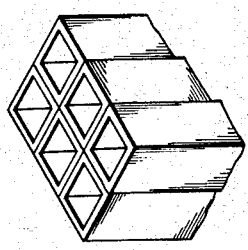
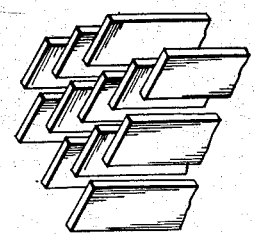
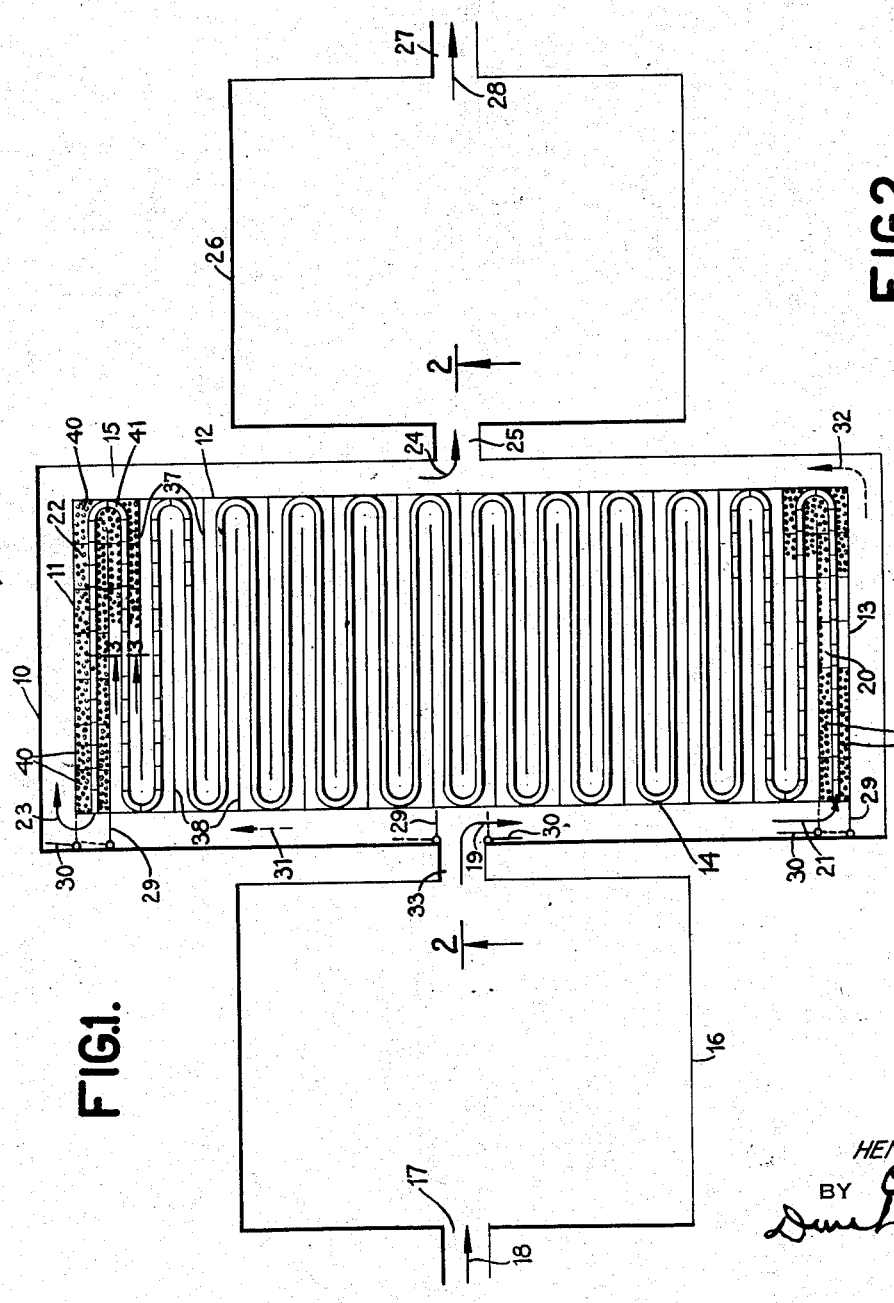
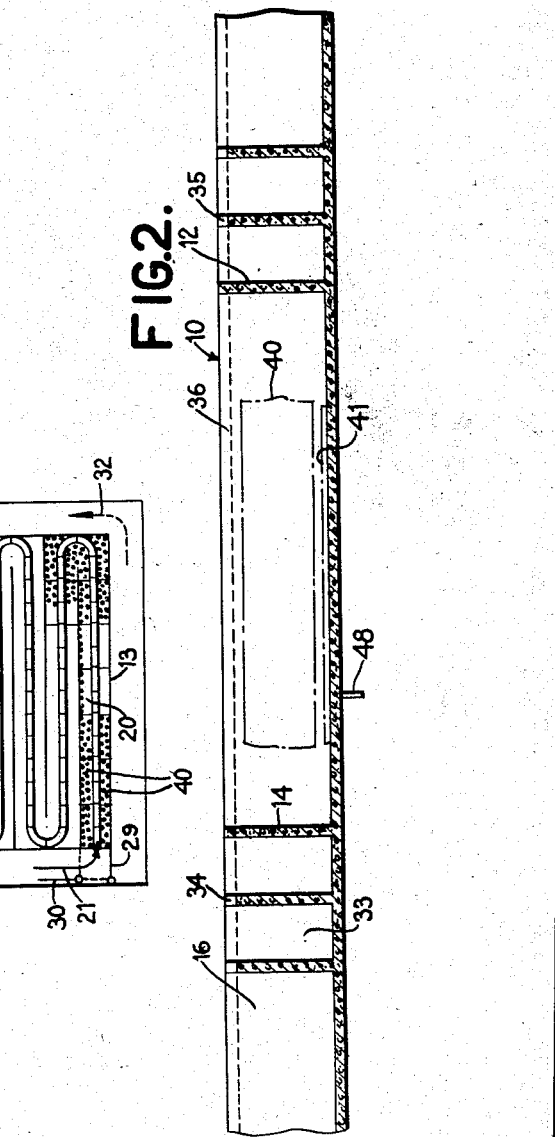
INVENTOR
HENRY B. SCHULHOFF
BY
ATTORNEYS Jan. 23, 1940. H. B. SCHULHOFF 2,188,162
SEWAGE TREATMENT
Filed Feb. 21, 1938 2 Sheets-Sheet 2
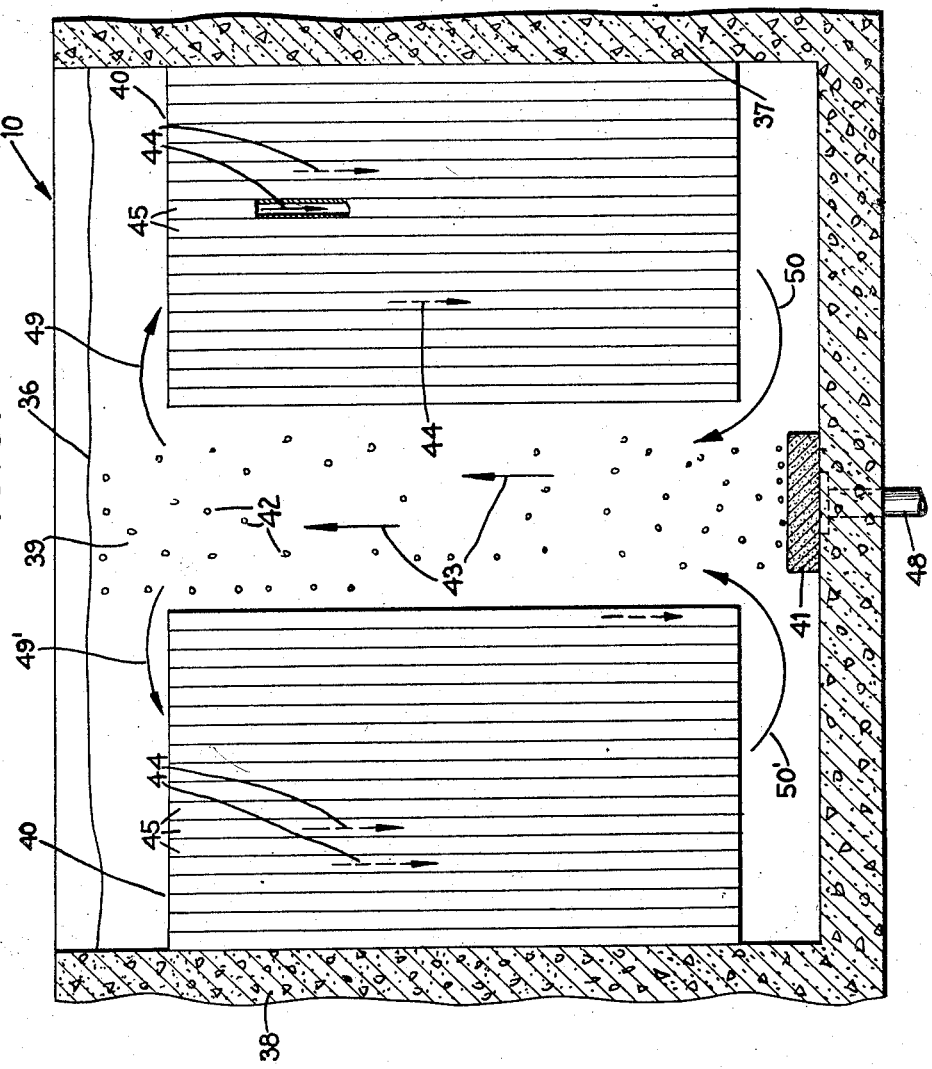
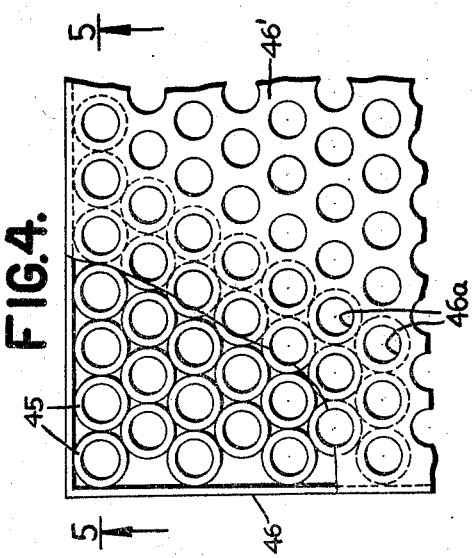
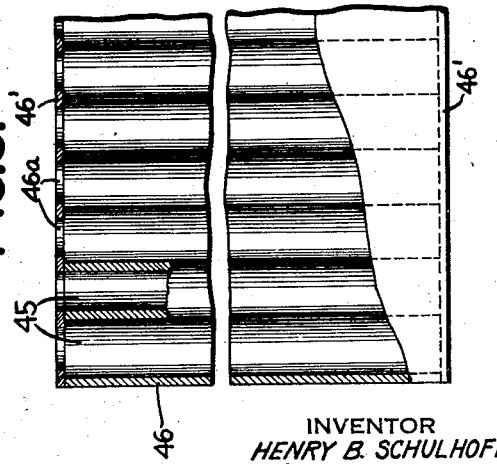
INVENTOR
HENRY B. SCHULHOFF
BY
ATTORNEYS Patented Jan. 23, 1940

2,188,162

UNITED STATES PATENT OFFICE 2,188,162

SEWAGE TREATMENT

Henry B. Schulhoff, New Brunswick, N. J.

Application February 21, 1938, Serial No. 191,654

3 Claims. (Cl. 210—7)

This invention relates to the clarification and purification of sewage by the action of aerobic bacteria. All foul or waste liquors which can be thus clarified and purified are included in the term sewage as used below.

Aerobic bacteria are naturally present in sewage. It is known that if contact surfaces for the bacteria are placed in the path of flow of the sewage, the bacteria have a tendency to cling to these surfaces. It is also known that activation of the bacteria by aeration causes them to attack that part of the organic matter in the sewage which they can reach, break the same down into harmless soluble and gaseous products, and coagulate the colloidal and soluble materials in a form which will settle out. It is further known that the bacetria establish themselves in enormous numbers on the contact surfaces when the latter are given a high degree of aeration.

Various practical difficulties have been met with in practice, in carrying out previous proposals for the clarification and purification of sewage which have involved the use of contact surfaces, and wherein attempts were made to collect the aerobic bacteria in large colonies on the contact surfaces provided, to activate the bacteria of these colonies by aeration, and to manage the flow of sewage so that the latter passes through passages between the contact surfaces or otherwise over or adjacent to the bacterial colonies in such manner as to obtain full clarification and purification of the sewage.

By the method and apparatus of the present invention, as will later appear, these difficulties are overcome.

A particular object of the invention is to provide a method of supplying the sewage undergoing treatment with a sufficient quantity of oxygen in solution to cause the aerobic and facultatively aerobic microorganisms to act with greater efficiency than heretofore thought possible.

Another object is to accomplish an unusually highly efficient aerobic purification of the sewage during its continuous flow through the clarification and purification tank or chamber of the apparatus; which tank or chamber will hereinafter, for brevity, be called the clarification tank or chamber.

Another object is so to introduce the necessary oxygen that too violent agitation of the sewage is avoided at the contact surfaces.

Another object is to provide large unobstructed surfaces upon which the clarifying and purifying microorganisms will adhere and over which the sewage will nevertheless flow in a manner to allow adequate clarification and purification.

Another object is the maintenance of sufficiently low hydrogen ion concentration (or high pH) in the sewage to insure that certain fungi injurious to high efficiency of the process will be inhibited, whereas the beneficial microorganisms will not be affected. This feature of the invention is of physical and chemical benefit to certain constituents of the sewage; for example, a certain amount of stabilization and coagulation may be induced even without the presence of the microorganisms—although the main benefits attained are largely through biological action.

A further object is to supply the necessary oxygen in such manner that its introduction in ordinary air under pressure and through a porous plate sets up currents which circulate the sewage past the contact surfaces in a way to render further mixing equipment unnecessary.

Still another object is to provide a method and apparatus such that the flow of sewage through the apparatus may be readily reversed, so that in an apparatus having a primary settlement tank the effluent from this tank may be entered into either end of the clarification tank and discharged from the opposite end of the latter even with the clarification tank incorporating, in accordance with another feature of the invention, and as is now preferred, a circuitous chamber through which the sewage is flowed, as for passage past a large number of contact surfaces seriatim.

The method and apparatus of the invention, and the foregoing and other features and advantages thereof, will be clearly understood from the following description when taken in connection with the accompanying drawings.

In these drawings, which in exemplification of the invention show forms of apparatus as now preferred to be used in carrying out the method of the invention:

Fig. 1 is a schematic view in top plan, showing in a system according to the invention the use of primary and secondary settling tanks in association with a clarification tank having a serpentine sewage-treatment chamber and one through which the direction of sewage flow is readily reversible when desired, as by opening and closing various gates.

Fig. 2 is a vertical section, taken on the line 2—2 of Fig. 1, on a somewhat enlarged scale and in sufficient detail to show certain tank-wall structures; although, in this view, for simplification, said gates are not shown, and the contact devices and aerators are indicated merely by relationship of their locations, shown in dot and dash lines, to a suitable sewage level given a broken line designation.

Fig. 3 is an enlarged vertical section taken transversely of any one of the reversely bent lengths of the serpentine chamber in the clarification tank, as for instance, such a section taken on the line 3—3 of Fig. 1.

Fig. 4 is a fragmentary top plan view, partially broken away, of a contact device of the type illustrated in Figs. 1 and 3, but with details added to show one form of convenient assemblage where the contact surfaces are, as in Figs. 1 and 3, the outer as well as the inner surfaces of bundled metal tubes of circular cross-section.

Fig. 5 is a vertical section taken substantially on the line 5—5 of Fig. 4.

Fig. 6 is a perspective view illustrating a plurality of tubes for providing the contact surfaces at the interiors only of the tubes with such tubes bundled and of hexagonal shape.

Fig. 7 is a similar view, illustrating how tubes of square cross-section could be bundled.

Fig. 8 is a perspective view illustrating the use of strips or plates of metal or other suitable material as these could be arranged, in substitution, for tubes, in carrying out the invention so far as the new contact device is concerned.

In the drawings, the numeral 10 designates a rectangular tank structure within which is located the clarification chamber here shown as serpentine and within a compartment established by four rectangularly related main bounding walls 11, 12, 13 and 14. There is thus provided within the tank 10 and all around the clarification chamber, an auxiliary compartment 15 in the shape of a hollow oblong.

Preferably, the sewage to be treated, on entering the installation, is subjected to screening, grit removal if necessary, and primary settling, in accordance with the usual practice. There is consequently shown at 16 a primary settling tank, the sewage influent entering this tank at 17 as indicated by the arrow 18. The sewage when ready to pass into the clarification chamber, is admitted to the latter by way of the auxiliary compartment 15, say in the direction indicated by the arrow 19, and thus to enter that terminal one of the oppositely extending corridors inside the clarification chamber which is marked 20, as indicated by the arrow 21. In such case, the sewage, after passing successively through all the corridors serpentine fashion, would leave the terminal corridor 22 and again enter the auxiliary compartment 15 as indicated thereafter to leave the auxiliary compartment 15 as indicated by the arrow 24, as to pass at 25 into a secondary settling tank 26, for eventual arrival at an effluent delivery opening 27 as indicated by the arrow 28.

Sewage flow as just described could be arranged for by any suitable valving means in auxiliary compartment 15. In the present case, this valving means is shown as comprising a plurality of swing gates. Six such gates are shown in Fig. 1, with three of them marked 29, closed, and the other three, marked 30, open; thereby to set the system for sewage flow as described above. When, however, the gates 30 are closed and the gates 29 are open, as indicated in broken lines, the sewage, after entering the auxiliary compartment 15, would flow in the direction of the broken-line arrow 31, so as first to enter the terminal corridor 22 of the clarification chamber and reverse its direction of flow through all these corridors, to leave the terminal corridor 20 and thence reenter the auxiliary compartment 15 for flow therethrough as indicated by the broken-line arrow 32.

A vestibular tank 33 is also shown as part of the installation illustrated, through which tank the effluent from the primary settling tank 16 passes on its way to the auxiliary compartment 15. The use which is made of this tank 33, in chemically treating the sewage before the latter enters the clarification chamber, to allow for convenient utilization of what is now believed to be a very important feature of the invention, will be hereinafter explained.

With the tank 33 present, the sewage is delivered therefrom to the auxiliary compartment 15, as by any suitable means, for instance by provision of a weir 34 at the exit from the tank 33 and of a weir 35 at the exit 25 from the auxiliary compartment 15, so that a predetermined surface height for the sewage flowing through the clarification chamber will be maintained. A suitable such surface level for the sewage in the clarification chamber is shown by the broken line marked 36 in Fig. 2. The rate of flow of the sewage through the serpentine path in the clarification chamber can then be made to depend on the rate of overflow from the tank 33 at the weir 34, which rate of overflow can be provided for in any known or suitable way, as, for instance, by suitable pumping means (not shown).

Referring to the illustrated clarification chamber more in detail, the various corridors between and including the terminal ones 20 and 22 are separated one from another by partitions 37 and 38 arranged in regular alternation, with the partitions 37 at one end joined to the wall 12 and at the other end spaced from the wall 14, and with the partitions 38 at one end joined to the wall 14 and at the other end spaced from the wall 12.

As the exemplifying embodiment of the invention is shown, the various walls and partions are of concrete, and the clarification chamber is really one long continuous concrete channel which returns back on itself repeatedly to make the unit very compact. As will be understood, a serpentine channel need not be employed in carrying out the invention. On the other hand, when a channel of this kind is used, it can be of any length, width or depth pursuant to the requirements of the method and the desired economy of construction.

In Fig. 3, the sewage, maintained at say the level 36 as above, is seen at 39. The relation of this level to the tops and bottoms of the contact devices shown at 40 is important, as will appear in a moment; while the relation of these contact devices to the aerators 41 (Figs. 1, 2 and 3) is now believed to be most advantageously that illustrated, that is, a placement of the aerators such that they are down in the sewage near the very bottom thereof and out of vertical alignment with the contact devices.

It will be noted that with the elements maintained as in Fig. 3, the contact devices 40 are wholly immersed in the sewage 39, with the tops of these devices well below the sewage surface level 36 and with the bottoms of these devices well above the bottom of the sewage and compressed air can be admitted to the bottom of the sewage, from the aerators 41, in a way such that the rising air bubbles 42 will establish upcurrents in the sewage, alongside a contact device 40, as indicated by the arrows 43, which upcurrents will continue as long as compensatory or complementary downcurrents of sewage can pass through this contact device with fairly free flow. These downcurrents are possible, as indicated by the arrows 44, because the contact surfaces of any device 40 are, pursuant to the present invention, arranged and spaced in a special way.

Essentially, the contact devices of the present invention are provided by a plurality of walls, of metal, concrete, glass or any other material suitable for the accumulation of aerobic bacteria thereon, which walls are all extended in substantially the same direction, an up and down one, and are spaced far enough apart to afford between them passages for the free flow of distinct sewage streams to make the lateral circulation of the sewage a really appreciable one. That is, the contact surfaces should not be so close together as considerably to impede the rate of lateral circulation of the sewage. To this same end, the contact surfaces are preferably straight, and they are also preferably parallel, to provide sewage-stream-flow passages of substantially constant cross-section from end to end if closed in all around, or of substantially constant sewage-flow capacity at all points along their lengths if not closed in all around. They are thus the opposite of the tortuous and mere trickleway passages characteristic of previously suggested filter beds made up of broken rock. The passage walls providing the contact surfaces should, on the other hand, be close enough together to insure that too great a part of the organic matters in each sewage stream flowing through a passage will not escape attack from the aerobic bacteria accumulated on the contact surfaces bounding that passage; an aim which is assisted materially when the passages are defined by contact surfaces which are substantially straight and parallel.

Desirably, and as illustrated in the drawings, these contact surfaces are the inside and outside walls of a multiplicity of substantially vertical and substantially straight metal tubes 45 bundled together side by side.

Thus bundled metal tubes are now preferred as the elements of the new contact device which provide the contact surfaces thereof; with these surfaces being either or both of the internal and external surfaces of the tubes. Another very satisfactory construction, as a preferred alternative, is an equivalent structure formed of poured concrete so as to have closely adjacent and substantially parallel tubular openings of circular or any other cross-section, extending therethrough, and of lengths to provide fairly long unobstructed flow-ways rather than mere orifices or ports.

When a collection of separate tubes of metal or other suitable material is used in building up the contact device of the invention, these may be of any desired cross-section. Such tubes, for example, could be hexagonal, or square. As shown in Fig. 6, hexagonal tubes could be bundled side by side, and in a way to obviate diminution of total contact-surface area such as results when circular tubes are thus bundled and the contact surfaces are to be provided only by the tube interiors. As shown in Fig. 7, square tubes could be bundled side by side, and in a way to obviate these contact-surface reductions perimetrically of a contact device 40 as well as at all points across the same.

The tubes thus bundled are secured together in any suitable way. Referring to Figs. 4 and 5, the tubes 45 are shown as packed in a box 46, which box could be used when merely the interiors, or both the interiors and the exteriors of the tubes are used as the contact surfaces. When merely the tube interiors are thus used, the box 46 could have top and bottom walls 46' apertured as shown at 46a, these apertures matching the openings at the upper and lower ends of the tubes 45 when crimped or packed tightly into the box 46 as illustrated.

Tubes need not be employed in providing a built-up contact device. Instead, flat or angled strips could be used, in combination with suitable spacing and holding means, to provide contact surfaces pursuant to the invention because carried by bounding walls of sewage segregating passages. As will be understood, such strips could be arranged to provide these passages, as well closed in all around as not; and in the latter case, to provide the passages so that each is of constant sewage-flow capacity from end to end. Flat strips, as they could be assembled to provide passages not closed in all around yet of constant sewage-flow capacity from end to end, are shown in Fig. 8.

As the invention is shown in Figs. 1 and 3, over the entire length of the serpentine clarification chamber, that is, along all the corridors thereof between and including the terminal ones 20 and 22 and also curvilinearly around the junction between each corridor and the next one, the aerators 41, which are desirably poorus-material air-diffuser plates, are arranged end to end, so as in effect to provide one long continuous aeration device occupying, except at one end of each corridor, the bottom longitudinal center of the serpentine course of the clarification chamber. At the corridor ends last-mentioned, the line of aerators 41 is so curved as to lead all the way to a side wall 12 or 14 of the clarification chamber before diverging from that wall to continue on in the next corridor.

Also as the invention is shown in Figs. 1 and 3, the contact devices 40 are placed end to end and lengthwise of the corridors of the clarification chamber, and on opposite sides of each corridor, so as to be horizontally offset from the aerators 41. These contact devices are shown as completely filling the entire width of each corridor except over the aerators, and alongside all curved parts of the line of extension of these last as well as along the straight parts of said line.

As will be understood, however, the aerators 40 41, or the contact devices 40, or equivalents, may be spaced one from another, regularly or irregularly, along the length of the clarification chamber, whether serpentine or not.

The air pipes and other equipment for supplying the aerators with compressed air for diffusion of the latter in finely divided condition into the sewage are not shown; but one such air supply pipe is indicated at 48 in Figs. 2 and 3.

The circulation of the sewage laterally of the channel through the clarification tank is a twofold one in the installation illustrated and having contact devices 40 along both the opposite sides of the channel. Referring to Fig. 3, one such circulation is that pursuant to the sequence of arrows 43, then an arrow 49, then the arrows 44 below the arrow last-mentioned and indicating sewage streams through the tubes 45 of the contact device 40 at the right, and then the arrow 50; and the other such circulation is pursuant to the sequence of said arrows 43, then an arrow 49', then the arrows 44 below the last-mentioned arrow and indicating sewage streams through the tubes 45 of the contact device 40 at the left, and then an arrow 50'.

However, practice of the invention is not to be limited to the lateral sewage circulations just described. For instance, there could be used merely a single line of contact devices and a single line of aerators; to make the sewage flow laterally through a single or unidirectional path. Again, while according to the construction illustrated, it is downcurrents of sewage which pass through the contact devices, it may well be that the advantages of the invention could be satisfactorily obtained by an arrangement of the parts, as by placing the aerators below the open bottoms of the contact devices, to have the upcurrents of sewage move through the contact devices and the compensatory or complementary downcurrents of sewage move exterior to the contact devices.

The lateral circulation of the sewage provided by the present invention, occurring while the sewage is flowing in the usual way toward the outlet from the clarification chamber, causes the sewage to corkscrew or spirally advance during its progression through the chamber. By this spiral advance the sewage is repeatedly broken up into a multitude of comparatively small yet distinct streams, with various streams including parts of yet differing from previous streams, and with each stream passed intimately over the aerobic bacteria colonies on the contact surfaces. The propelling air for the lateral sewage circulation places oxygen in solution in the sewage, and this to an extent sufficient to give a high degree of activity to the aerobic bacteria on the contact surfaces, and these destructively attack the organic matters in the sewage streams as the latter flow through the passages of the contact devices.

It may be explained that many aerobic microorganisms possess the ability of either stabilizing or coagulating the offensive matters in semi-colloidal or colloidal condition in offensive liquids such as sewage or in true solution therein; these matters when thus stabilized or coagulated providing a jelly or slime which accumulates on surfaces contacting the sewage and in which slime colonies of the bacteria collect. The problem has long been to find some practicable method of bringing the sewage into intimate relation with the these bacteria breaking up the sewage repeatedly between its passage over the contact surfaces, and while activating the bacteria by aeration yet without agitating the sewage in the vicinity of the contact surfaces. It will be seen that by the present invention, all these desiderata are fully satisfied; even the one last mentioned, although the compressed air admitted to the sewage may cause considerable disturbance thereof at the point of admission of the air. Such disturbance, however, occurs only in a part of the sewage remote from the contact surfaces, especially where the supplied air acts to set up rising sewage currents wholly exterior to the contact devices, as is shown in the drawings and as is preferred. There is, consequently, a very high limit to the degree of safe aeration of the beneficial aerobic microorganisms; since a large amount of oxygen in solution in the sewage can be provided for, and later to be supplied to the bacteria for their activation, but without any or too violent agitation at the contact surfaces carrying these bacteria. When oxygen is dissolved in sewage in amounts above even a low minimum, many of the microorganisms which collect on the contact surfaces, and which by their life processes can transform such a liquor as sewage into a stable, inoffensive one, become very active in their clarifying and purifying work. When they are highly activated, by a large amount of oxygen in solution, and the sewage is repeatedly flowed over the contact surfaces while being repeatedly broken up into separate streams guided close to the bacteria colonies on the contact surfaces, all according to the present invention, the sewage can be treated much more rapidly than heretofore, and in such a way that not only will septicity be overcome but the offensive yet stabilizable or coagulable matters in the sewage will be transformed to a state such that when the sewage is detained quiescent, as in the secondary settling tank 26, after emergence from the clarification chamber, these matters may be removed and treated in the manner usual for such sludges, to leave a liquor which is clear, sparkling and not of a putrescible character.

The method of the present invention is capable of being assisted, like those previously suggested, by the use of a primary settling tank. Therefore, as already stated, such a tank is indicated at 16 as part of the illustrative apparatus shown in the drawings. Primary settling of sewage is always advantageous. This settling results in the removal of a certain portion of the non-colloidal organic matters; even though sufficient organic matters will remain in suspension or solution to cause septicity and nuisances later unless these are removed after the sewage leaves the primary settling tank.

Referring now to the feature of the present invention which involves the maintenance of sufficiently low hydrogen ion concentration (or high pH) in the sewage, this is based on a realization that the stabilizing and coagulating film formed by the beneficial microorganisms on a contact surface in the clarification chamber is at the peak of efficiency, when sufficient oxygen is present in solution and violent agitation is absent over and about the film, and when, in addition, this film is not obscured by the overgrowth of other and undesirable microorganisms such as the so-called sewage fungi. The organisms beneficial in sewage treatment possess the ability of carrying on their work in the presence of a high pH in the sewage. This is in contrast to most fungi, including the undesirable one last-mentioned. The pH of a liquid, which rises as the degree of hydrogen ion concentration falls, can at most have a value of 14 according to the pH table. Such a value represents complete alkalinity. Any pH value in excess of 7 is one of alkalinity, just as a pH value below 7 is one of acidity. I have found that when the pH of the sewage is brought to a value in excess of 7, and notably when this pH attains 9 or 10, an optimum environmental condition is had for the formation and persistence of the film on the contact surfaces formed by the beneficial micho-organisms; that is, with such a sewage pH, the beneficial organisms flourish and the undesirable organisms are inhibited or are made relatively innocuous.

Reverting to the tank 33, this is shown in Fig. 1 at a convenient location to provide a mixing chamber in which the sewage, before it is admitted to the clarification chamber, may be treated with lime or an equivalent, that is, with any suitable alkaline material, so as to raise the pH of the sewage to any value desired in excess of 7.

If the film on the contact surfaces should become too thick for maximum efficiency, as from particularly foul sewage or from sewage with too low a pH or otherwise, or from flow of the sewage through the clarification chamber over too long a period in the same direction, reversal of the direction of sewage flow will remedy the situation. One satisfactory way to carry out this flow reversal feature of the invention, and in relation to a long and elaborately serpentine channel through the clarification chamber such as shown in Fig. 1, has already been described; by means of the gates 29 and 30. Heterotrophic organisms will be prevalent at the inlet, with autotrophic organisms predominating at the outlet, and mixtures of both near the middle portion, provided the channel is of sufficient length; and the film will invariably be heaviest at the point of entry of the sewage into the clarification chamber, for here the food concentration for the microorganisms is greatest. If after a heavy film has been set up at the influent end, the flow is reversed, and kept so, a heavier film will be induced in that portion of the channel now the inlet but formerly the outlet; and at the same time the previously formed heavy film will be oxidized and otherwise reduced in bulk.

If the pH is made very or rather high, as may sometimes be desirable, but which might have some tendency to slow up settlement of the solids when the latter arrive at the secondary settling tank, settlement of these solids can be hastened, according to another feature of the invention, by adding iron sulphate or some other iron salt or other suitable coagulant, and making this addition preferably during and toward the latter part of the spiral or corkscrew advance of the sewage, thereby to aid in the settlement out of the sludge as an easily handled sludge floc.

The method of the present invention is not only notably resistant to adverse influences, but has other advantages aside from those already brought out. Since air is supplied only over a portion of the channel floor, marked savings in cost of construction and operation as compared with existing systems are obtained. The flexibility of operation is such that any degree of purification can be arranged for, as by varying the ratio of contact surface to sewage flow, while the rate of spiral advance of the sewage through the clarification chamber and hence over the contact surfaces can be changed in accordance with differences between various sewages treated, by varying the intensity of aeration and hence the rate of sewage circulation laterally of the chamber.

Variations and modifications, as already pointed out or otherwise, are possible within the scope of the invention; and parts of the improvements may be used without others.

I claim:

1. In a system for the biological clarification and purification of sewage by the action of aerobic bacteria and by the contact-aeration method, a tank; means including an inlet and an outlet for said tank for permitting sewage to be flowed therethrough while maintaining the sewage at a predetermined depth therein; an aerobic-bacteria-colonization structure incorporating contact walls for said bacteria the surfaces of which provide a collection of channels open from end to end and extending generally in an up and down direction, on which surfaces and within said channels said colonization occurs; supporting means for fixing said structure in the tank at a level such that the bottoms of said channels are above the bottom of the tank and the tops of said channels are below the top of the sewage so as always to maintain the sewage below, above and within said channels; and means for repeatedly breaking up the sewage and so successively bringing different parts of the sewage into special intimate adjacency to the bacteria in said colonies, and for at the same time activating the bacteria by aeration while preventing such agitation of the sewage adjacent to said colonies as to break up the same by dislodging the slime accumulated therewith, said structure having its walls so shaped and spaced that said channels are substantially straight and parallel and of substantially constant cross-section from end to end, said last-named means including means for discharging compressed air in finely divided condition into the sewage near the bottom of the tank and at a point to one side of said structure relative to the direction of flow of sewage through the tank between its inlet and outlet.

2. A contact-aeration method for the biological treatment of sewage in a clarification and purification tank by the action of aerobic bacteria, said tank of the kind having therein a collection of contact members in fixedly spaced relation to allow the sewage to flow between them and between a point near the bottom of the tank and a point near the top of the sewage in the tank, said members for establishing contact surfaces for the accumulation thereon of slime and bacteria colonies in said slime, which involves substantially continuously flowing the sewage through said tank between an ingress and an egress end thereof and above and below said members and alongside the latter, while substantially continuously admitting to the sewage compressed air in finely divided condition at a point low in the tank and so far removed from said members as to prevent such agitation of the sewage adjacent to said colonies as to break up the same by dislodging the slime accumulated therewith, and while hastening the bacterial digestion of the sewage by preventing clogging of the spaces between said members due to overgrowths of sewage fungi by introducing into the sewage sufficient of alkaline material to maintain the pH value of the sewage approximately at least as high as 8.

3. A contact-aeration method for the biological treatment of sewage in a clarification and purification tank by the action of aerobic bacteria, said tank of the kind having therein a collection of contact members in fixedly spaced relation to allow the sewage to flow between them and between a point near the bottom of the tank and a point near the top of the sewage in the tank, said members for establishing contact surfaces for the accumulation thereon of slime and bacteria colonies in said slime, which involves substantially continuously flowing the sewage through said tank between an ingress and an egress end thereof and above and below said members and alongside the latter, while substantially continuously admitting to the sewage compressed air in finely divided condition at a point near the bottom of the tank and so far removed from said members as to prevent such agitation of the sewage adjacent to said colonies as to break up the same by dislodging the slime accumulated therewith, and while maintaining evenness of flow of sewage through the spaces between said members as the result of redisposing the location of most rapid build-up of slime in the tank from one end of the tank to the other, and periodically reversing the direction of flow of the sewage through the tank.

HENRY B. SCHULHOFF.